United States Patent [19]

Hassman

[11] 4,184,303
[45] Jan. 22, 1980

[54] CONNECTING MEMBER FOR CONSTRUCTING FLOORS

[76] Inventor: Kenneth Hassman, 267 Froom Cres., Regina, Saskatchewan, Canada

[21] Appl. No.: 934,313

[22] Filed: Aug. 17, 1978

[30] Foreign Application Priority Data

Aug. 23, 1978 [CA] Canada .................................. 304917

[51] Int. Cl.² ............................................. E04C 2/42
[52] U.S. Cl. ...................................... 52/669; 52/762; 52/780; 52/588
[58] Field of Search ................ 52/669, 667, 664, 588, 52/762, 763, 764, 772, 780, 773; 256/17

[56] References Cited

U.S. PATENT DOCUMENTS

| | | | |
|---|---|---|---|
| 260,499 | 7/1882 | Pratt | 52/669 |
| 3,420,015 | 1/1969 | Costanzo | 52/669 |
| 4,077,334 | 3/1978 | Svirklys | 52/669 |

Primary Examiner—James L. Ridgill, Jr.
Attorney, Agent, or Firm—Larson, Taylor and Hinds

[57] ABSTRACT

A support member or tie bar for supporting and connecting T-shaped flooring members. The support member has an integral one-piece body with an elongated base and a number of support structures or bridges extending upwardly from the base. Each support structure has a relatively wide bottom and a narrow upper section. The upper section has a ledge formed on each transverse side thereof for supporting an edge of the horizontal portion of the T-shaped member. The base and the adjacent transverse sides of each pair of adjacent bottoms form a groove for receiving and supporting a bottom edge of the flooring member. Each support structure and the underlying base forms a trapezoid shape as seen in longitudinal cross-section and the center of the trapezoid is hollow. Each ledge is located a short distance below the top of the support structure. A transversely extending horizontal lip is formed on each transverse side of each support structure at the bottom of the support structure but spaced above the top surface of the base.

17 Claims, 4 Drawing Figures

CONNECTING MEMBER FOR CONSTRUCTING FLOORS

BACKGROUND OF THE INVENTION

This invention relates to support members for supporting and connecting structural members such as flooring members or beams.

It is known from applicant's Canadian Pat. No. 989,134 issued May 18, 1976 that flooring members which are generally T-shaped in cross-section can be constructed with the use of glass fiber reinforcements and suitable polyesters. By using a pultrusion process to construct these flooring members, they can be made particularly strong and thus are suitable for heavy load areas such as animal pens and floor areas in vehicles for transporting livestock. In addition, these flooring members have the advantage that they are not subject to corrosion or rot which can be a significant problem when other materials are used to construct flooring for animals. These known flooring members have a horizontal top portion having a substantially flat upper surface suitable for forming a portion of the floor surface. In addition they have a vertically-extending support portion which enables the flooring member to withstand the heavy loads without undue bending.

As also disclosed in Canadian Pat. No. 989,134, these T-shaped flooring members can be supported by and held together by the use of generally flat tie bars which stand upright on a longitudinal edge. These known tie bars have suitable slots extending downwardly from the upper edge thereof to accommodate the vertically extending support portion of the T-shaped flooring member. With the use of two or more of these tie bars, a number of T-shaped flooring members can be connected together in a parallel arrangement to form a floor surface. The use of the bars also has the advantage of distributing a heavy load applied to one flooring member to adjacent flooring members.

Because these known tie bars only withstand the loading forces on the flooring members substantially at one location which is at the bottom edge of the T-shaped flooring member, these known tie bars may be subject to excessive wear, particularly when there is not a good close fit between the T-shaped flooring member and the tie bar. In addition, because the horizontal top portion of each flooring member is not supported in any manner by the tie bar, there may be slight movement of the T-shaped flooring members as heavy loads are applied to them and this movement may also result in eventual wear to the tie bar and perhaps even eventual failure of the tie bar or the T-shaped flooring member. It is thus desirable to provide an inexpensive and easily constructed support member which adequately supports not only the bottom edge of the T-shaped flooring member but also the two upper side edges of the flooring member. In addition there is a desire for a tie bar or support member better able to transfer a large point loading applied to one flooring member to adjacent flooring members.

Accordingly, one object of the present invention is to provide an integral, one-piece support member which provides good load support to structural members such as flooring.

Another object of the invention is to provide an inexpensive support member which will support both bottom edges of structural members connected thereto and also upper, side edges of the structural members.

A further object of the invention is to provide an easily constructed support member capable of connecting in load bearing relationship a number of T-shaped flooring members.

SUMMARY OF THE INVENTION

Accordingly, the support member of the present invention for supporting and connecting structural members such as flooring members comprises an integral one-piece body having an elongated base and a number of support structures extending upwardly from the base. Each support structure has a relatively wide bottom section and a narrow upper section and the upper section has support means formed on each transverse side thereof for supporting an upper side edge of a structural member. The base and adjacent transverse sides of each pair of adjacent bottom sections form a groove for receiving and supporting a bottom edge of a structural member.

In a particularly preferred embodiment of the support member, each support structure and the adjoining underlying base forms a trapezoid shape as seen in longitudinal cross-section, the center of the trapezoid being hollow. The support means formed on each transverse side is preferably a ledge providing a horizontal surface spaced a short distance below the top of the support structure.

In order to provide a positive connection between each T-shaped flooring member and the support member, each support structure preferably has a transversely extending horizontal lip formed on each transverse side thereof and provided on the bottom section a short distance above the top of the base. If the T-shaped flooring member is formed with a base section wider than the remainder of the vertically extending support portion, a firm connection can be formed between the T-shaped flooring member and the support member. The wide bottom section of the flooring member has a width greater than the distance between two opposing horizontal lips.

Other features and advantages will be explained in and will be understood from the following detailed description of preferred embodiments of the support members taken in conjunction with the accompanying drawings.

DETAILED DESCRIPTION OF PREFERRED EMBODIMENTS

Figure 1:
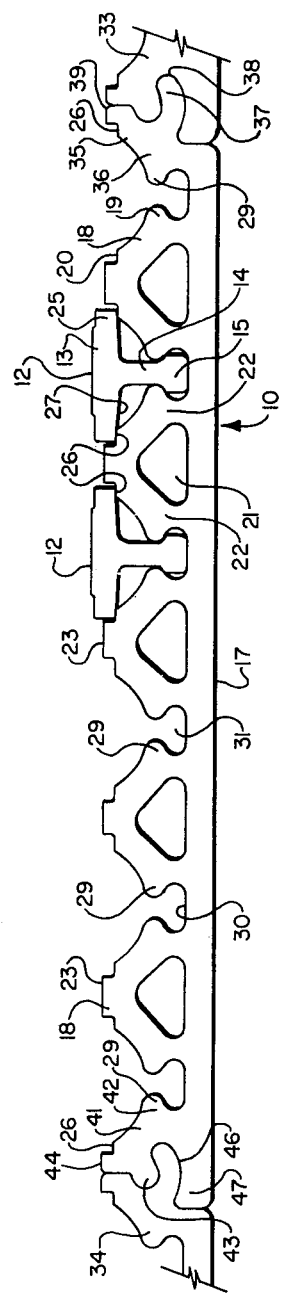
FIG. 1 is a longitudinal side view of one embodiment of the support member of the present invention together with two T-shaped flooring members connected thereto.
Figure 2:
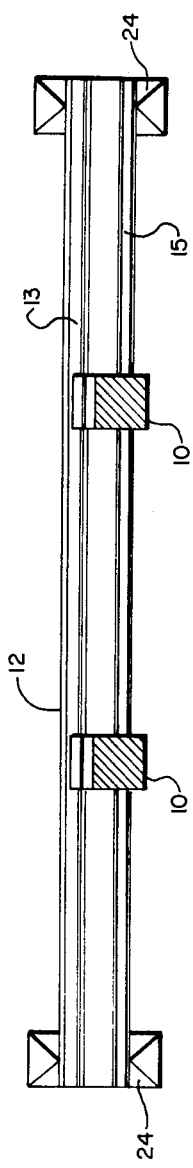
FIG. 2 is a longitudinal side view of a T-shaped flooring member connected to two support members according to FIG. 1.

The support member 10 shown in FIG. 1 is used to support and connect structural members such as the T-shaped flooring members 12 only two of which have been illustrated. As described in applicant's Canadian Pat. No. 989,134, each of these flooring members has a horizontal top portion 13 having a substantially flat upper surface suitable for forming a portion of a floor surface and a vertically-extending support portion 14 which enables the flooring member to withstand relatively heavy loads without undue bending. Preferably the strength of the flooring member 12 is increased by providing a wide bottom section 15 along the length of the support portion 14. It will be appreciated that the provision of the wide bottom section 15 substantially increases the resistance of the flooring member to bending along its longitudinal axis. Typically, one of these flooring members could have a width in the transverse direction of approximately 1½ inches and a height of approximately 1 inch although a variety of sizes are available. The flooring members are constructed by the use of a pultrusion method and they consist essentially of glass fiber reinforcements and suitable polyesters. These flooring members are able to withstand heavy loads and heavy traffic which are encountered in animal pens, particularly those containing large animals such as cattle and horses. They are also extremely resistant to corrosion and thus have a long useful life. Opposite ends of the flooring members are firmly supported by and mounted on a foundation or other suitably rigid support frame such as that illustrated schematically at 24 in FIG. 2.

The support member 10 comprises an integral one-piece body having an elongated base 17 and a number of support structures 18 extending upwardly from the base 17. These support structures have a relatively wide bottom 19 and a narrow upper section 20. In the preferred embodiment shown in FIG. 1, there are five complete support structures 18 and each support structure and the adjoining underlying base 17 forms a trapezoid shape as seen in longitudinal cross-section, the center of the trapezoid being hollow. The hollow center 21 in this embodiment of the support structure is generally triangular in shape as seen in longitudinal cross-section. The bottom 19 of a support structure consists essentially of two leg portions 22 with each leg 22 sloping upwardly and inwardly towards the upper section 20. The top 23 of the upper section 20 is flat and is located slightly below the top surfaces of the adjoining flooring members. The width of the top 23 taken in the longitudinal direction is approximately equal to or slightly less than the gap separating the horizontal top portions 13 of adjacent flooring members 12. As can be seen from FIG. 2, the transverse dimension of each support member 10 can be slightly less than the height of the support member. In a particular preferred embodiment, the width of the support member 10 is 1 inch while the height is 1¼ inch.

The upper section 20 of each support structure 18 has support means formed on each transverse side thereof for supporting an upper side edge 25 of the flooring member. Preferably, this support means comprises a ledge 26 which provides a horizontal surface spaced a short distance below the top 23 of the support structure. This ledge 26 is relatively small and contacts only the outer extremities of the horizontal top portion 13 along one side thereof. Thus the remainder 27 of the horizontal top portion is left unsupported. The particular construction of the support member 10 shown avoids unnecessary use of materials to construct the support member thus reducing the expense involved and the overall weight of the support member. At the same time, the support member 10 provides a very good three point support arrangement for each of the T-shaped flooring members which in turn results in increased floor life.

Each support structure 18 can be provided with a transversely extending horizontal lip 29 on each transverse side thereof. The lip, which is semi-cylindrical in shape, is provided on a leg portion 22 and is spaced above the top 30 of the base. Opposing lips 29 on adjacent support structures 18 provide means for positively fastening the wide bottom section 15 of a flooring member to the support member. The width of the bottom section 15 is greater than the gap between the opposing lips 29 so that the bottom section 15 cannot easily be pulled upwardly through the gap between the opposing lips. The bottom section 15 is snuggly accommodated in the groove 31 bounded by the base 17, two leg portions 22, and two opposing lips 29. It should also be noted that, when the bottom section 15 is received in the groove 31, the bottom surface of the flooring member should rest firmly against the top 30 of the base so that adequate support is provided.

The support member 10 is provided with a connecting device at each end thereof for connecting the support member to another similar support member such as the support members 33 and 34, the ends only of which are shown in FIG. 1. With the use of these connecting devices, the combined supporting members 10, 33, and 34 are properly arranged in longitudinal alignment and, in addition, each connecting device forms ½ of a further support structure. A first connecting device 35 at one end has an upstanding leg 36 and a curved, outwardly extending arm 37 connected to the leg. The leg 36 is provided with a ledge 26 similar in size and position to the ledges formed on the support structures 18. This ledge is on the side of the leg 36 opposite the arm 37 and is also adapted to support an upper, side edge of a structural member. The arm 37 forms an upwardly facing concave curve and the end 38 of the arm is rounded. The top end 39 of the leg 36 lies in the same horizontal plane as the tops 23 of the support structures 18. The leg 36 is also provided with a lip 29 similar to the other lips 29 formed on the support structures 18. It will thus be seen that a flooring member 12 can be accommodated between the leg 36 and the adjacent support structure 18 in the same manner as the flooring member would be accommodated between two support structures 18.

A second connecting device 41 is connected to the support member 34 and this device also has upstanding leg 42 and an outwardly and downwardly extending arm 43. The arm 43 is connected to the leg near the top thereof. A ledge 26 is also formed on the leg 42 together with a lip 29. The ledge and lip are on the inwardly facing side of the leg 42. As in the first connecting device, the top surface 44 of the leg 42 is in the same horizontal plane as the tops 23. As can be seen from FIG. 1, the first connecting device of the support member 34 is connected to the second connecting device 41 of the support member 10. In particular, the arm of the first connecting device is snuggly accommodated in recess 46 formed between the arm 43 and an end portion 47 of the base 17. This effectively prevents the support member 10 from separating in the longitudinal direction from the support member 34. The second connecting device 41 of the support member 10 can be connected to the first connecting device of the support member 34 by placing the arm of the first connecting device in transverse alignment with the recess 46 and moving the support member 10 transversely towards the support member 34. Alternatively, the support member 34 can be placed end to end with the support member 10 but with its longitudinal axis at a slight angle to the longitudinal axis of the support member 10. The arm of the first connecting device can be pushed into the recess 46 from the open end of the recess.

One preferred embodiment of the support member 10 is constructed using a combination consisting of 20% glass fibers and 80% of a polyolefin such as polypropylene or polyethylene. Support members can also be constructed from plain polypropylene or polyethylene. The particular material which should be selected will depend upon the intended application of the supporting bar, for example, the weight of the animals to be supported by the flooring members which are connected by the support member. If glass fiber is used, its content in the support member can range from 5% to 50%. The support member 10 is constructed using injection molding, which is a widely used method of forming thermoplastic material. Molten plastic material is forced through a nozzle into a suitable mold cavity. After injection of the molten plastic, the plastic is chilled in the mold. When the plastic has cooled sufficiently, the mold is parted and the support member 10 ejected from the mold. Using this technique, the support members 10 can be produced at a reasonably low cost.

This support member of the invention serves a variety of functions when used with T-shaped flooring members including:

(a) it maintains a uniform spacing between a section of flooring members connected thereto;

(b) it helps to support a number of flooring members connected thereto and prevents each flooring member from shifting or rocking as moving loads are applied; and (c) it transfers a heavy load, for example a point load from a single flooring member to adjacent flooring members so that the single flooring member is not as likely to fail.

Figure 3:
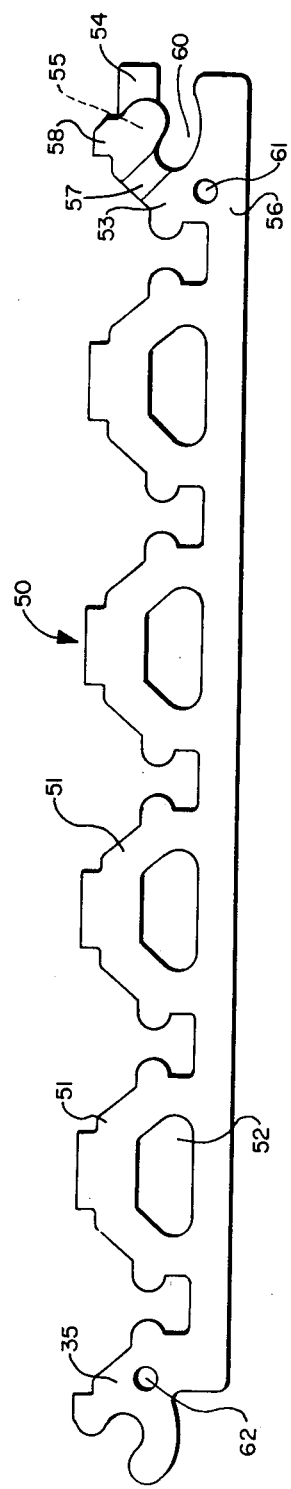
FIG. 3 is a longitudinal side view of a second embodiment of a support member constructed according to the present invention.
Figure 4:
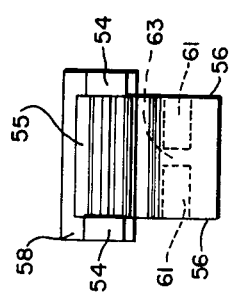
FIG. 4 is an end view of the right hand end of the embodiment shown in FIG. 3.

A second embodiment of a support member constructed in accordance with the present invention is shown in FIG. 3 and is designated generally by numeral 50. The support member 50 is constructed in a similar fashion to the above described support member 10 except for the differences noted hereinafter. Again, each support structure 51 and the adjoining underlying base forms a trapezoid shape as seen in longitudinal cross-section and the center of the trapezoid is hollow. However, in this embodiment the hollow center 52 also has a trapezoid shape in longitudinal cross-section. The second connecting device 53 is located on the left hand end of the support member 50 and this second connecting device is similar in construction to the device 41 of the first embodiment except for the addition of two horizontal, outwardly extending tabs, both of which are shown in FIG. 4. One tab 54 is located on each side of the arm 55. The tabs 54 are located outwardly in the transverse direction from the longitudinal sides 56 of the support member. An inclined surface 57 extends from each side 56 to the outside surface of the tab 54. If desired, the upper portion 58 of the leg of the connecting device can also be extended outwardly beyond the plane of the side 56 of the support member. It will be appreciated that the tabs 54 will serve to hold the support member which is connected to the second connecting device 53 in proper longitudinal alignment with the support member 50. In other words, the arm in the recess 60 will not be able to slide in the transverse direction out of the recess. It will further be appreciated that the tabs 54 need only be provided on the second connecting device 53 and are not required on the other end of the support member 50.

If desired circular holes can be formed in the connecting devices at each end of the support member. These holes 61 and 62 do not extend completely through the connecting device as shown in FIG. 4 but a portion 63 in the center of the support member remains. The holes 61 extend into the elongated base of the support member while the holes 62 are formed where the arm of the first connecting device 35 is connected to the leg. These holes can be provided to offset the thicker wall thicknesses of the support member in the regions of the holes.

Computer analysis of the support members shown in FIGS. 1 and 3 has shown that these support members transfer the downward force created by a large weight on one flooring member to other adjacent flooring members quite efficiently so that there is a more uniform loading of the flooring members. It will be appreciated that in order to accomplish this transfer the support members themselves are not supported from below except perhaps at their ends. In addition, the design of the connecting devices at each end of the support member is such that large loads on a particular support member are efficiently transferred to adjacent support members connected thereto.

The support members of the present invention can vary in length to accommodate from 4 to 24 T-shaped flooring members depending upon the spacing required therebetween. Thus the length of the support member can vary from 11⅜ inches to 4 feet. The preferred length at the present time for these support members is about 1 foot in length. Even this preferred length is subject to variation depending upon the spacing desired between the T-shaped flooring members. This spacing can for instance vary from 13/64 of an inch to 1 inch.

An engineering study has been conducted on the support members of the present invention and it has revealed that these support members are quite effective in transferring a point load within a section or group of parallel flooring members. They are less effective in transferring a load from one section or group of flooring members to another section or group. The load carrying capabilities of a section or group of flooring members is least when the point load is applied near the connecting joints of the support members. In one test conducted, a 1,000 pound load was applied in increments to one of the middle flooring members of an isolated section or group directly above a support member made of polypropylene. The section of flooring was 36 inches long and 2 polypropylene clips were connected to the flooring members at equal distances from the ends of the flooring members and from each other. The support members in the test were able to transfer approximately 80% of the applied load from the centrally located flooring member or slat to the other flooring members (in the tests there were 5 other flooring members). The polypropylene support member underwent only slight permanent deformation while distributing the 1,000 pound point load.

In another test conducted with support members of the present invention, two 36 inch sections of flooring members were connected together using two support members on each section of flooring. The two support members were again equally spaced from the ends of the flooring members and from each other. An increasing load was applied to one of the flooring members closest to one of the joints connecting two support members and directly above the support member connected to this flooring member. The two polypropylene clips transferred approximately 57% of the 600 pound point load to the other 11 flooring members and 37% of an 800 pound load applied. Twenty-four percent of the 600 pound load and 10% of the 800 pound load were transferred through the two connected joints of the support members to the adjoining floor section.

What I claim as my invention is:

1. A support member for supporting and connecting structural members such as flooring members comprising an integral one-piece body having an elongated base and a plurality of supporting structures extending upwardly from said base, each support structure having a relatively wide bottom and a narrow upper section, said upper section having support means formed on each transverse side thereof for supporting an upper, side edge of a structural member, wherein said base and the transverse sides of adjacent bottoms of said support structures form a groove for receiving and supporting a bottom edge of one of the structural members.

2. A support member according to claim 1 wherein said support member consists essentially of polypropylene.

3. A support member according to claim 1 wherein said support member consists essentially of polyethylene.

4. A support member according to claim 1 wherein the support means formed on each transverse side is a ledge providing a horizontal surface spaced a short distance below the top of the support structure.

5. A support member according to claim 1 wherein each support structure has a transversely extending horizontal lip formed on each transverse side thereof, said lip being provided on the bottom of the support structure but spaced above the top of said base.

6. A support member according to claim 1 wherein said support member is made of glass and polypropylene.

7. A support member according to claim 1 wherein said support member is made of glass and polyethylene.

8. A support member according to claim 1 wherein said support member is made of approximately 20% glass and a polyolefin.

9. A support member according to claim 1 or 4 wherein said support member has a connecting device at each end thereof for connecting the support member to another similar support member so that the combined support members are arranged in longitudinal alignment, each connecting device being constructed to form one half of a further support structure.

10. A support member according to claim 1 wherein each support structure and the adjoining underlying base forms a trapezoid shape as seen in longitudinal cross-section, the center of said trapezoid being hollow.

11. A support member according to claim 10 wherein the support means formed on each transverse side is a ledge providing a horizontal surface spaced a short distance below the top of the support structure.

12. A support member according to claim 11 wherein said support member has a flat rectangular top having a transverse width at least twice its width in the longitudinal direction of the support member, said flat top bridging the gap formed between two adjacent structural members supported by said support member.

13. A support member according to claim 11 including a first connecting device at one end having an upstanding leg and a curved outwardly extending arm connected to said leg near the vertical center of said leg, said leg having further support means on the inwardly facing side of said leg near the top thereof, said further support means also being adapted to support an upper, side edge of a structural member.

14. A support member according to claim 13 wherein said support member is made of at least 20% glass and the remainder is a plastics material, and the support member is constructed by injection molding.

15. A support member according to claim 13 including a second connecting device at the other end having an upstanding leg and an outwardly and downwardly extending arm connected to said leg near the top of said leg, additional support means being provided on the inwardly facing side of said leg of said second device near the top thereof, said additional support means being adapted to support an upper side-edge of a structural member.

16. A support member according to claim 15 wherein said second connecting device includes horizontal, outwardly extending tabs, one on each side of the arm, said tabs in use acting to hold another support member connected to said second connecting device in proper longitudinal alignment.

17. A support member according to claim 15 wherein each support structure has a transversely extending horizontal lip formed on each transverse side thereof, said lip being provided on the bottom of the support structure but spaced above the top of said base.

* * * * *